United States Patent
Kalliomaki et al.

(10) Patent No.: US 9,193,248 B2
(45) Date of Patent: Nov. 24, 2015

(54) DRIVE SYSTEM FOR SUNROOF ASSEMBLY

(71) Applicant: MAGNA CLOSURES INC., Newmarket, Ontario (CA)

(72) Inventors: Eric V. Kalliomaki, Uxbridge (CA); Raymond Edward Fortin, Newmarket (CA); Michael Smart, Keswick (CA)

(73) Assignee: MAGNA CLOSURES, INC., Newmarket (CA)

( * ) Notice: Subject to any disclaimer, the term of this patent is extended or adjusted under 35 U.S.C. 154(b) by 0 days.

(21) Appl. No.: 14/444,213

(22) Filed: Jul. 28, 2014

(65) Prior Publication Data

US 2015/0035320 A1 Feb. 5, 2015

Related U.S. Application Data

(60) Provisional application No. 61/860,070, filed on Jul. 30, 2013.

(51) Int. Cl.
*B60J 7/043* (2006.01)
*B60J 7/057* (2006.01)

(52) U.S. Cl.
CPC ............... *B60J 7/043* (2013.01); *B60J 7/0573* (2013.01)

(58) Field of Classification Search
CPC .......... B60J 7/043; B60J 7/057; B60J 7/0573
USPC ..................... 296/223; 49/348–351
See application file for complete search history.

(56) References Cited

U.S. PATENT DOCUMENTS

| | | | | |
|---|---|---|---|---|
| 3,584,415 A | * | 6/1971 | Keefe et al. ..................... | 49/348 |
| 3,715,931 A | * | 2/1973 | Littmann ........................ | 74/411 |
| 4,260,189 A | | 4/1981 | Periou et al. | |
| 4,794,733 A | * | 1/1989 | Kanemaru ...................... | 49/348 |
| 5,024,022 A | * | 6/1991 | Ito ................................... | 49/139 |
| 5,095,655 A | * | 3/1992 | Warren .......................... | 49/374 |
| 5,516,187 A | | 5/1996 | Zani et al. | |
| 5,822,921 A | * | 10/1998 | Griepenstroh et al. ......... | 49/350 |
| 5,826,376 A | * | 10/1998 | Yamamoto et al. ............. | 49/350 |
| 5,850,711 A | * | 12/1998 | Takahashi et al. .............. | 49/351 |
| 6,530,175 B2 | * | 3/2003 | Sato et al. ....................... | 49/138 |
| 6,658,795 B2 | * | 12/2003 | Jung ............................... | 49/375 |
| 7,425,033 B2 | * | 9/2008 | Regnier et al. ................ | 296/223 |
| 2002/0104267 A1 | * | 8/2002 | Sato et al. ........................ | 49/350 |
| 2005/0198903 A1 | * | 9/2005 | Isomura et al. ................ | 49/351 |

* cited by examiner

*Primary Examiner* — Dennis H Pedder
(74) *Attorney, Agent, or Firm* — Dickinson Wright PLLC

(57) ABSTRACT

In an aspect, a sunroof assembly is provided for a vehicle, and comprises a sunroof panel, a final gear and a drive arm. The sunroof panel has a longitudinal axis and which is mounted to the vehicle for longitudinal movement between an open position and a closed position. The final gear is mounted to a stationary member of the vehicle, and is pivotable about a pivot axis between a first position and a second position. The drive arm is pivotable with the final gear about the pivot axis and which has a drive end that is laterally movable relative to the sunroof panel but that is operatively connected to the sunroof panel to drive the sunroof panel longitudinally between the open and closed positions during pivoting movement of the final gear between the first and second positions.

14 Claims, 10 Drawing Sheets

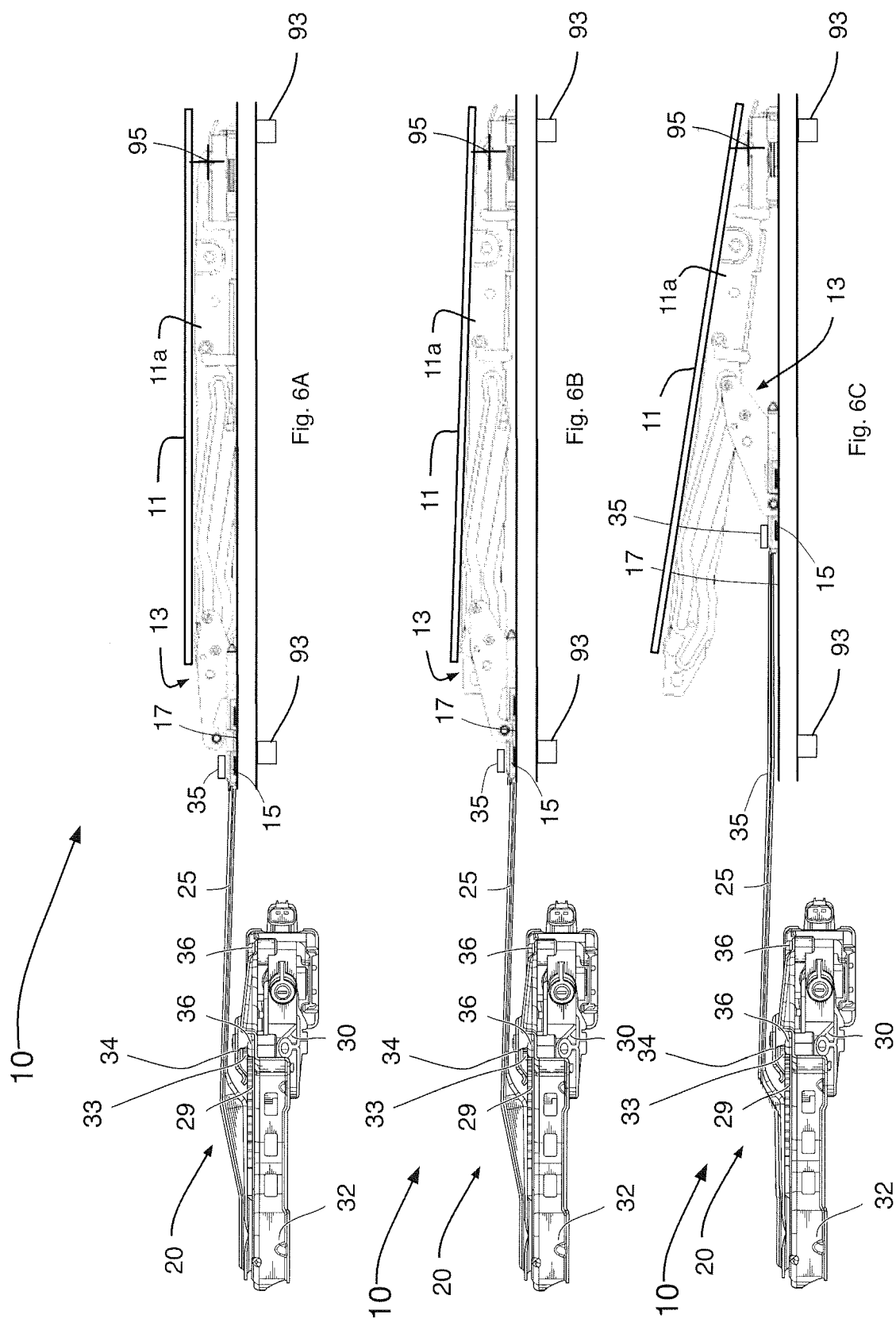

DRIVE SYSTEM FOR SUNROOF ASSEMBLY

CROSS-REFERENCE TO PRIOR APPLICATION

This US patent application claims the benefit of U.S. Provisional Patent Application Ser. No. 61/860,070 filed Jul. 30, 2013, entitled "DRIVE SYSTEM FOR SUNROOF ASSEMBLY", the entire disclosure of the application being considered part of the disclosure of this application and hereby incorporated by reference.

FIELD

This application relates to closure panel assemblies, such as vehicle sunroof assemblies, and more particularly to drive systems for sunroof assemblies.

BACKGROUND

Vehicle sunroofs are well known in the art. The drive system for some sunroofs incorporates a spiral cable and a worm gear. In some cases, such drive systems involve a relatively large number of components. Additionally the components that make up a drive system for a certain size of sunroof are typically not all able to be used for the drive system of a different size of sunroof. For example, the spiral cables may have unique lengths for each size of sunroof produced by a sunroof drive system manufacturer. There is little standardization on sunroof dimensions; each make and model of vehicle typically has a sunroof having unique dimensions. As a result, a sunroof drive system manufacturer may keep a large number of different inventory items in stock in order to be ready to manufacture sunroof assemblies on tight production schedules for a range of models of vehicle. The large number of inventory items ties up money and complicates production. Furthermore, the large number of parts that are involved in manufacturing the sunroof drive assembly can reduce the reliability of the assembly. It would be advantageous to provide a sunroof drive assembly that at least partially addresses one or more the above problems.

SUMMARY

In an aspect, a sunroof assembly is provided for a vehicle, and comprises a sunroof panel, a final gear and a drive arm. The sunroof panel has a longitudinal axis and which is mounted to the vehicle for longitudinal movement between an open position and a closed position. The final gear is mounted to a stationary member of the vehicle, and is pivotable about a pivot axis between a first position and a second position. The drive arm is pivotable with the final gear about the pivot axis and which has a drive end that is laterally movable relative to the sunroof panel but that is operatively connected to the sunroof panel to drive the sunroof panel longitudinally between the open and closed positions during pivoting movement of the final gear between the first and second positions.

In another aspect, a sunroof system is provided, which includes a sunroof panel and the drive system described above. The final gear is driven by an actuator. All motive power that is transferred to the sunroof panel from the actuator is transferred through the drive arm.

In yet another aspect, a drive system is provided for driving a sunroof panel longitudinally on a vehicle. The drive system includes a channel member that has a guide channel that extends laterally and that is connectable to a sunroof panel, a final gear that is mounted to a stationary member of the vehicle, and is pivotable about a pivot axis between a first position and a second position, a drive arm that is pivotable with the final gear about the pivot axis and which has a drive end that is laterally movable relative to the channel member but that is operatively connected to the channel member to drive the sunroof panel longitudinally between the open and closed positions during pivoting movement of the final gear between the first and second positions, and a bidirectional motor that is operatively connected to a drive gear that meshes with the final gear thereby operatively connecting the motor to the final gear. The motor, the drive gear, the final gear, the drive arm and the channel member all extend in planes that are generally parallel to one another.

Further features will be described or will become apparent in the course of the following detailed description.

BRIEF DESCRIPTION OF THE DRAWINGS

Embodiments will now be described in detail by way of example, with reference to the accompanying drawings, in which:

FIGS. 6A-6C are side views of the sunroof panel and drive system in several positions throughout a range of movement.

DETAILED DESCRIPTION OF EXAMPLE EMBODIMENTS

Figure 1A:
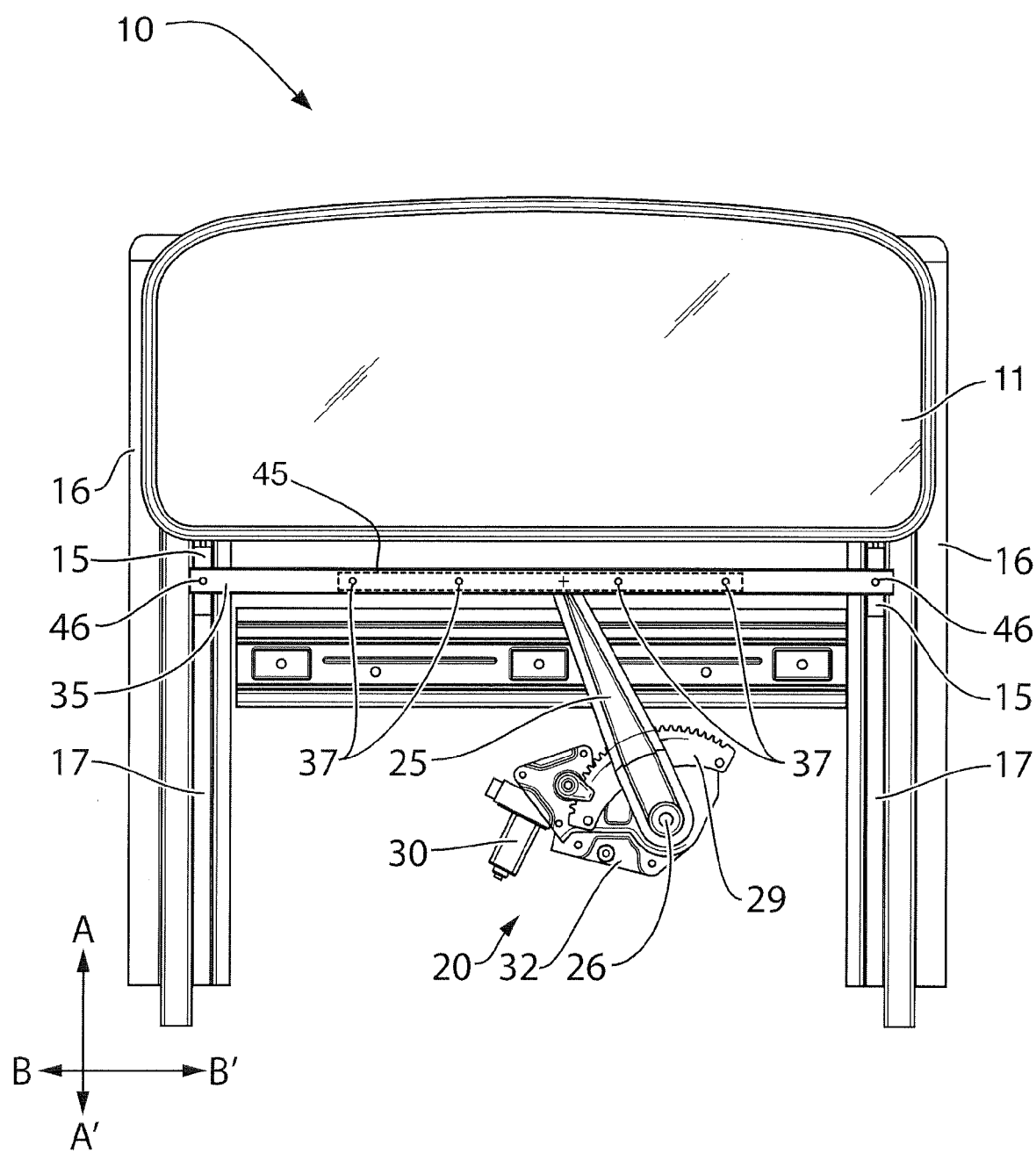
FIG. 1A depicts a top plan view an embodiment of a sunroof assembly, including a sunroof panel and a drive system for operating the sunroof panel.

Reference is made to FIG. 1A, which shows a sunroof assembly 10 for use with a vehicle, partially shown at 99. Throughout this description, the terms longitudinal, longitudinal axis, longitudinally and the like refer to a direction generally parallel to axis A-A' as illustrated in FIG. 1A, where A is toward a front and A' toward a rear of the sunroof assembly. The terms transverse, transverse axis, transversely and the like refer to a direction generally parallel to axis B-B', where B is toward a left side and B' toward a right side of the sunroof assembly 10. The axis B-B' is perpendicular to the axis A-A'. The terms vertical, vertical axis, vertically and the like refer to a direction generally perpendicular to both axes A-A' and B-B'.

Figure 1B:
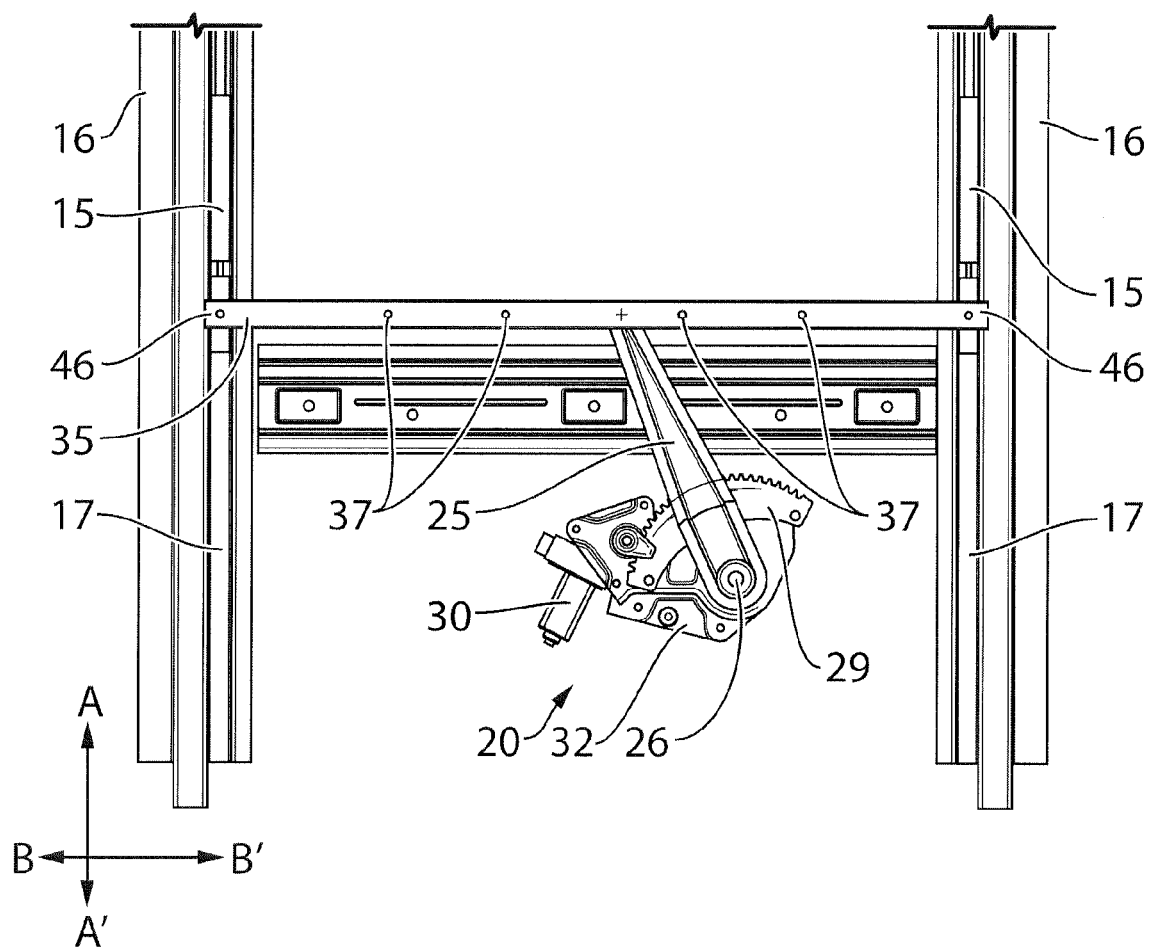
FIG. 1B depicts the sunroof assembly of FIG. 1A without the sunroof panel present.

The sunroof assembly 10 comprises a sunroof panel 11 and a drive system 20. The sunroof panel 11 is supported on a support structure 11a (FIGS. 6A-6C), which is supported on two longitudinally extending sliders 15 via a linkage 13. Referring to FIG. 1, each slider 15 is slidable in a guide portion 17 (e.g. a channel) of a longitudinally extending track 16. The tracks 16 are rigidly mountable to one or more structural members 93 (FIGS. 6A-6C) in the vehicle roof, shown at 97. The sunroof panel 11 is movable between a closed position (shown in solid lines in FIG. 4) and an open position (shown in dashed outline in FIG. 4) by sliding of the sliders 15 longitudinally in the guide portions 17. The structure and operation of the sliders 15 and the guide portions 17 and the connection of the sunroof panel 11 thereto may be as described in U.S. Pat. No. 7,425,033 issued Sep. 16, 2008, the contents of which are incorporated herein by reference.

Figure 2A:
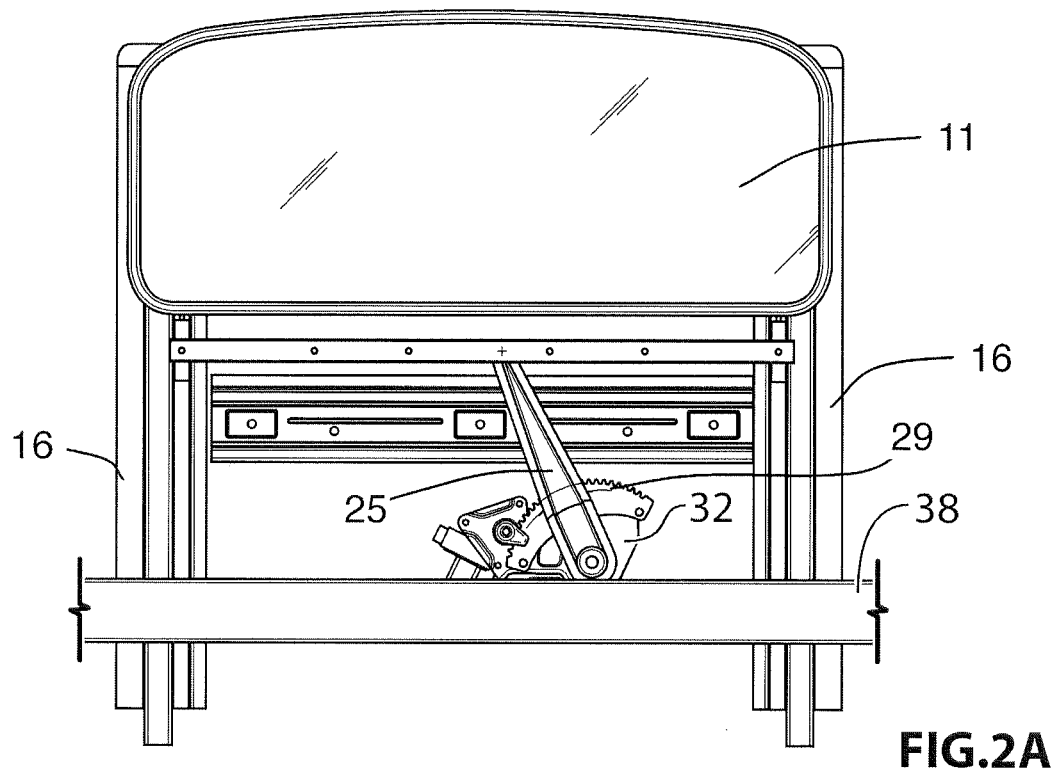
FIG. 2A depicts the sunroof assembly of FIG. 1A with the drive system mounted on a roof member.
Figure 2B:
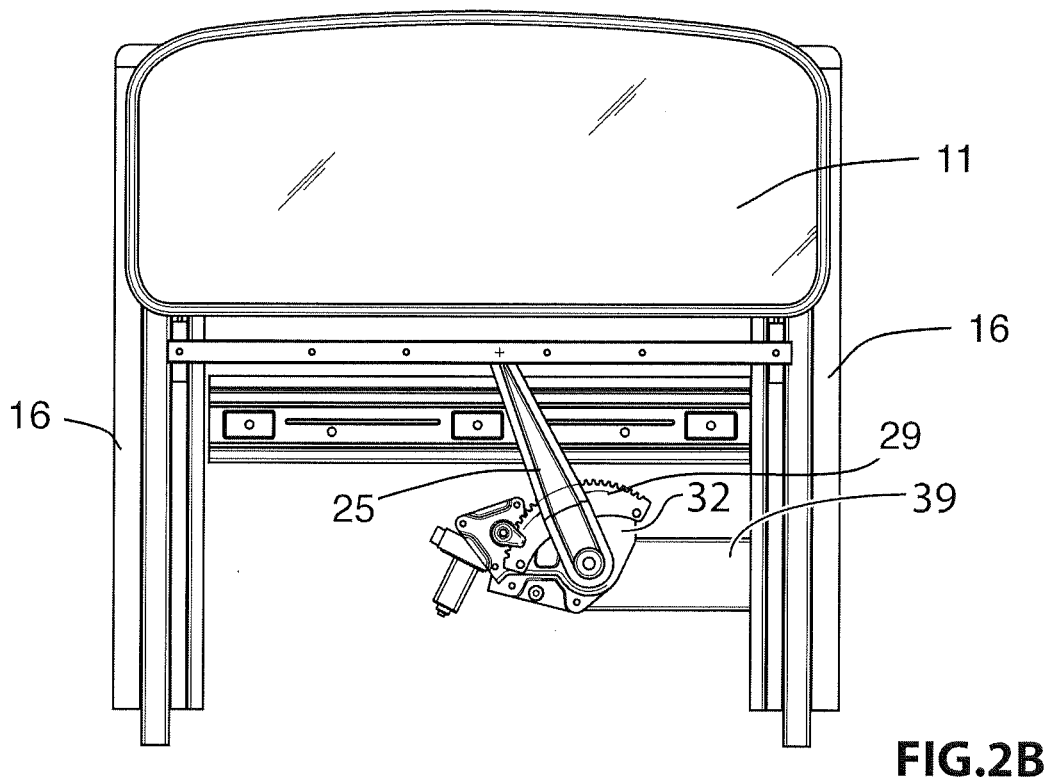
FIG. 2B depicts the sunroof assembly of FIG. 1A with the drive system mounted on a support bracket rigidly connected to a track of the sunroof assembly.

Referring to FIG. 1A, a drive system 20 is provided to drive the movement of the sunroof panel 11 between the open and closed positions. The drive system 20 comprises a final gear 29 that is pivotally mounted to a stationary member in the vehicle 99 for pivotal movement about a final gear pivot axis 26. The pivotal mounting of the final gear 29, may be, for example, by way of a pin, shown at 23. The pin 23 may be provided in the form of a rivet, a bolt or the like. In an example shown in FIG. 2A, the stationary member is a base plate 32 that is, in turn, mounted to a transversely extending roof rail 38 of the vehicle 99 (FIG. 2A). Alternatively, the base plate 32 may be rigidly mounted on a reinforcement bracket 39 that is itself rigidly mounted to one or both of the tracks 16 (FIG. 2B). The base plate 32 permits the drive system 20 to be handled as an assembly, however it is alternatively possible for the final gear 29 and other components that may make up the drive system 20 to be individually mounted to, for example, the roof rail 38.

Figure 3A:
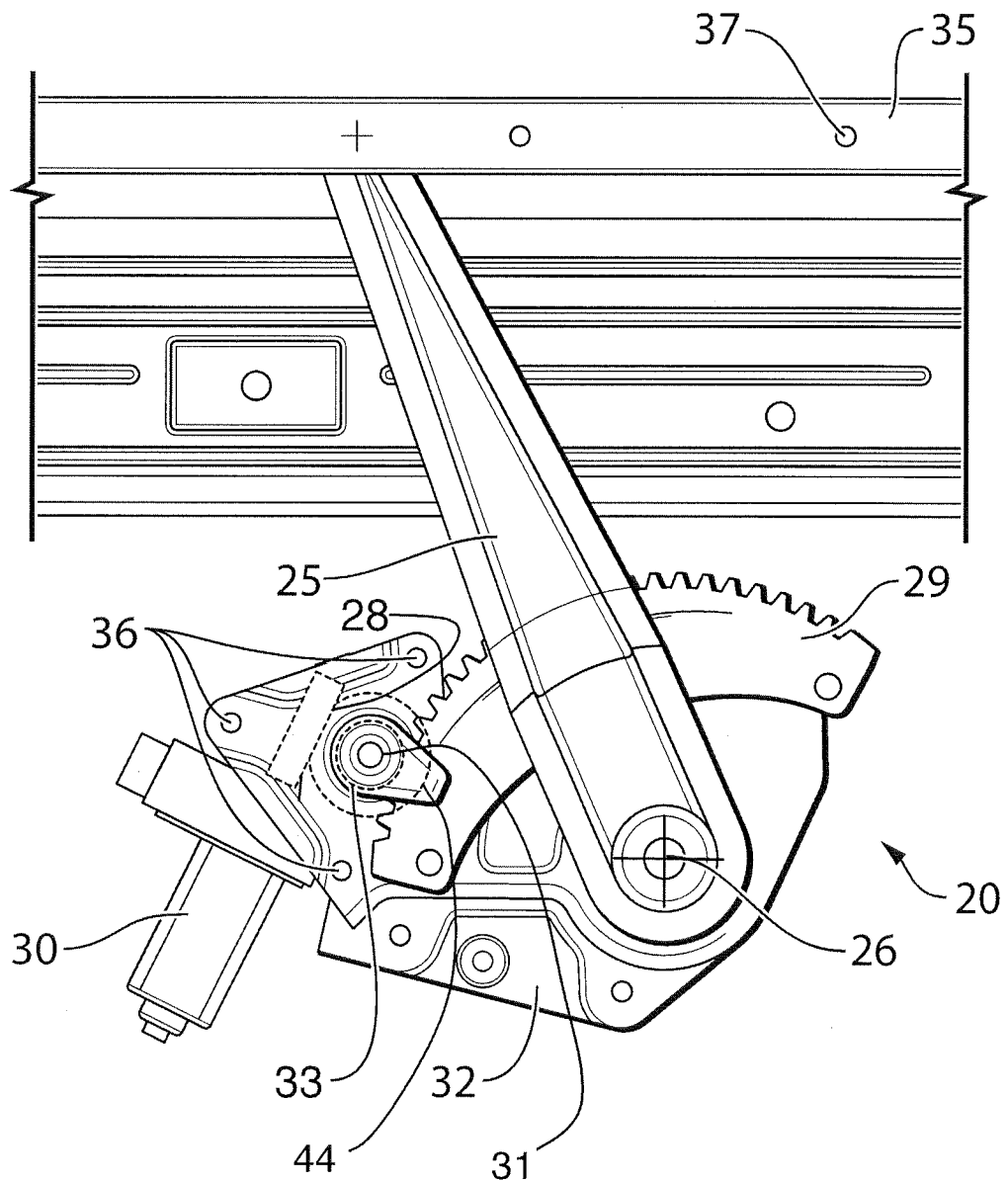
FIG. 3A depicts a magnified top view of the drive system depicted in FIG. 1.
Figure 3B:
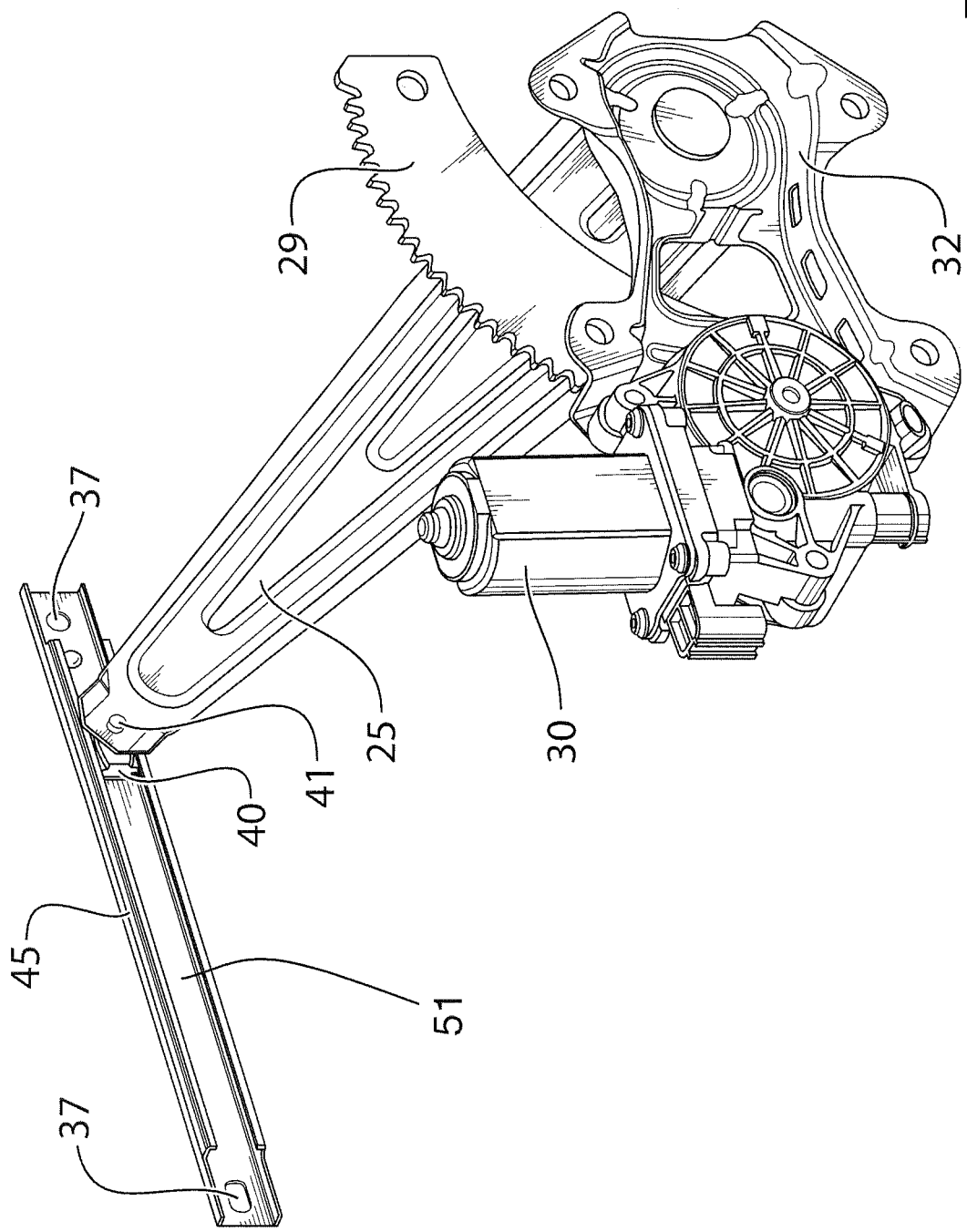
FIG. 3B depicts an isometric view from below and rear of the drive system depicted in FIG. 3A.
Figure 3C:
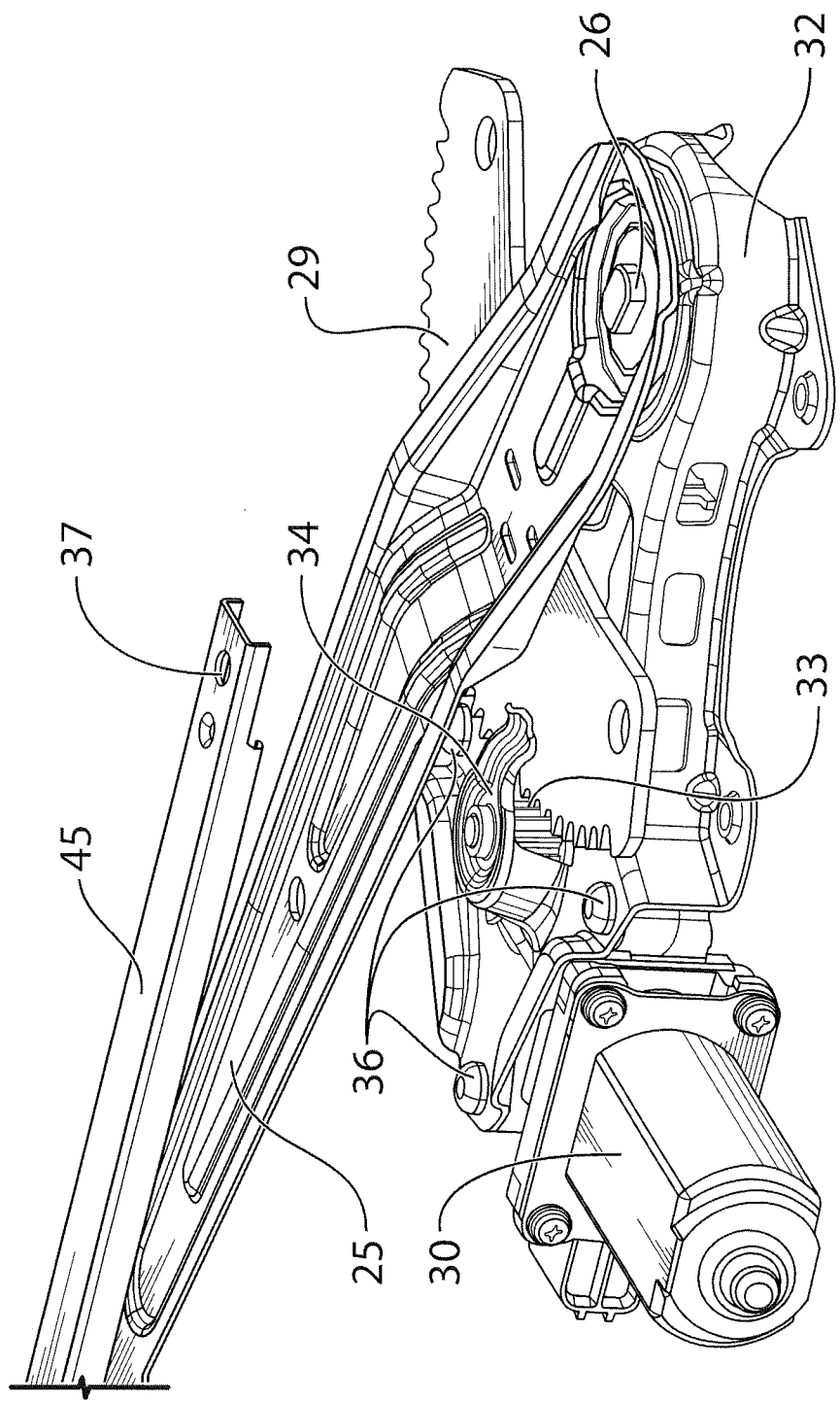
FIG. 3C depicts an isometric view from rear and above of the drive system depicted in FIG. 3A.
Figure 3D:
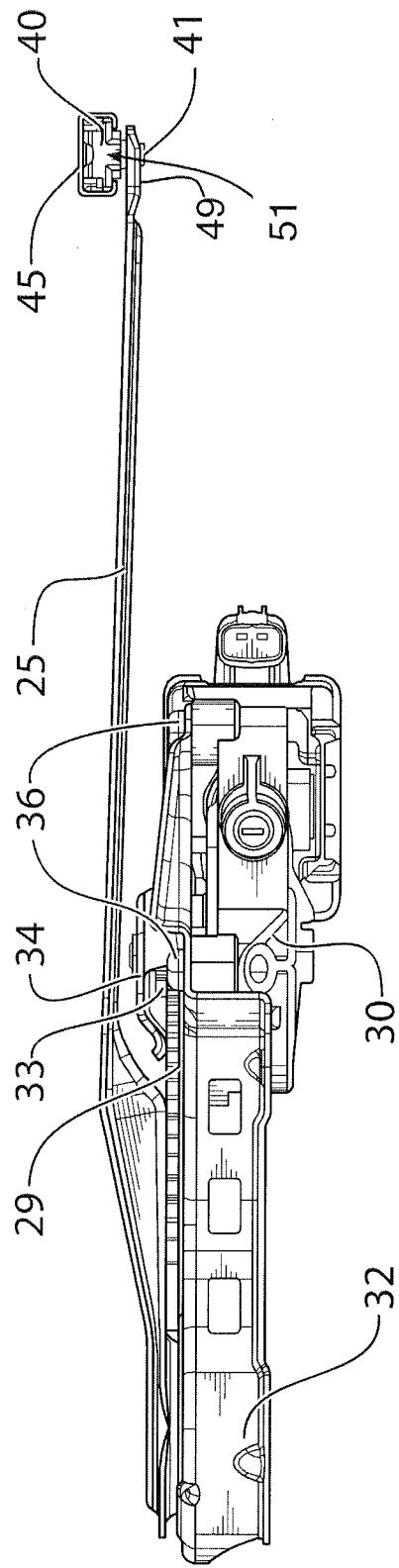
FIG. 3D depicts a side view of the drive system depicted in FIG. 3A.
Figure 3E:
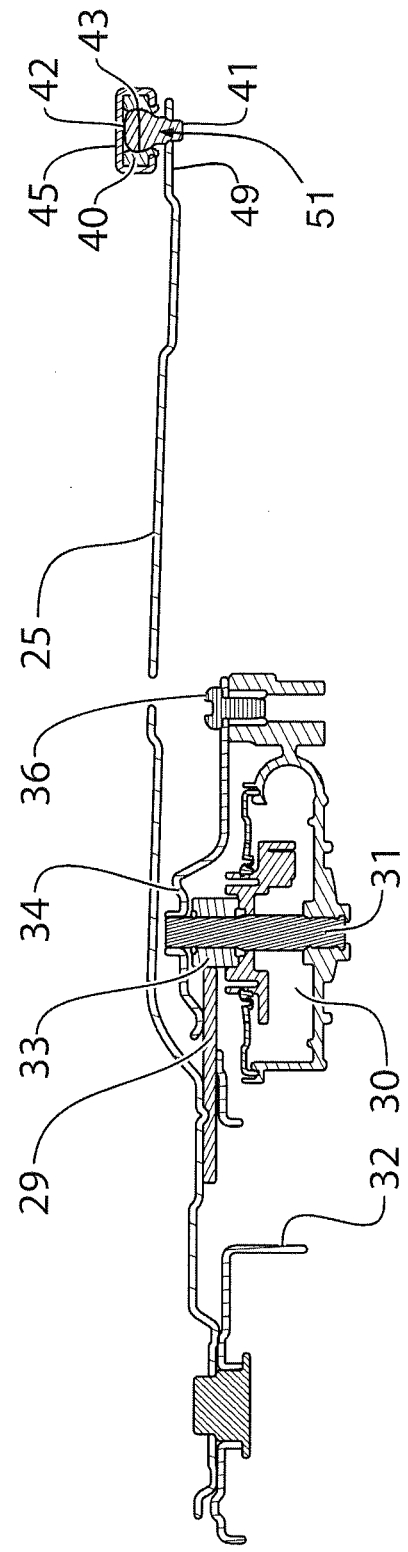
FIG. 3E depicts a side cross-sectional view taken through a drive shaft of a motor and along a length of a drive arm of the drive system depicted in FIG. 3D.
Figure 4:
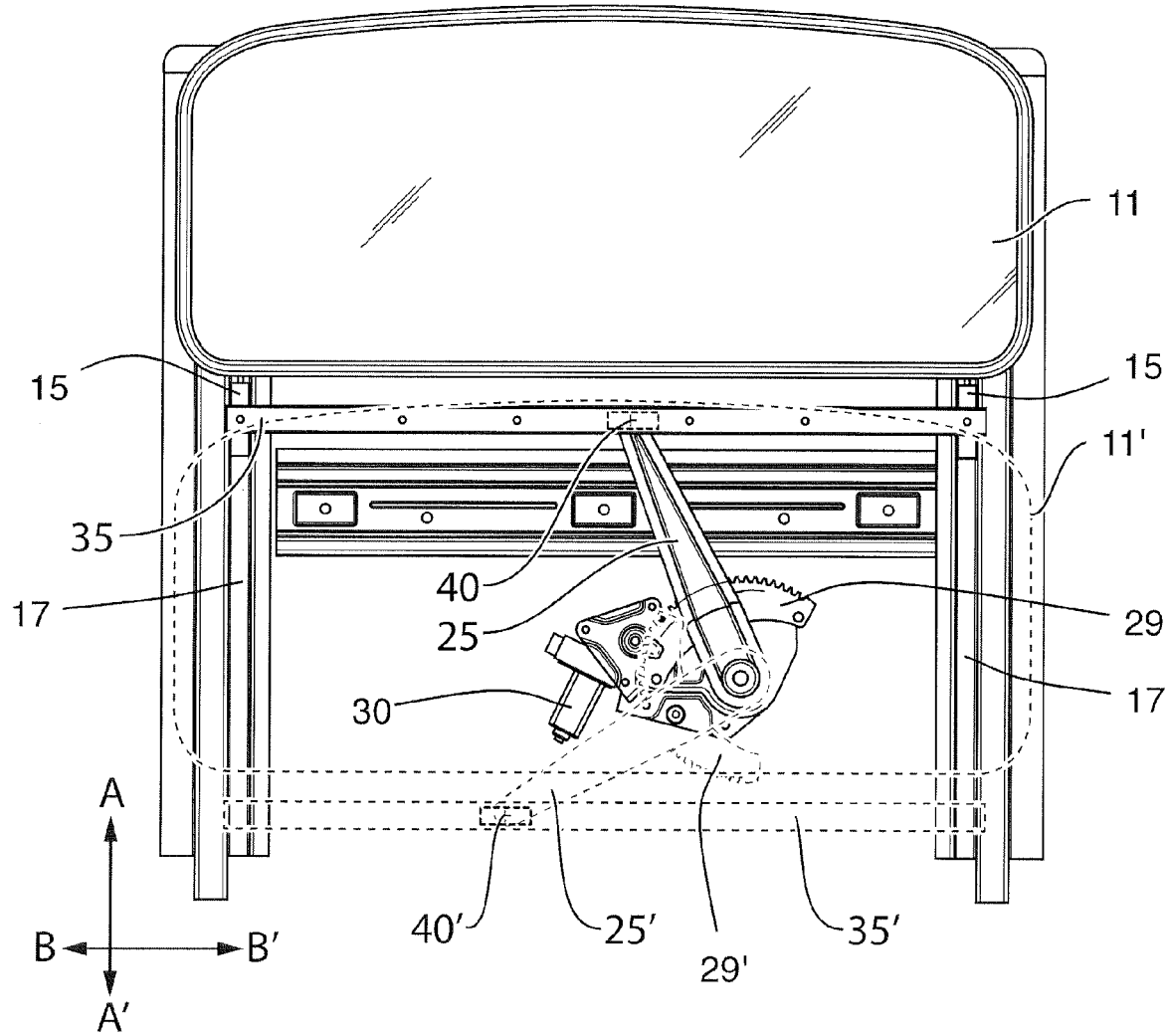
FIG. 4 depicts the sunroof assembly in open and closed positions.

With reference to FIG. 4, the final gear 29 as shown in the figures may be an arcuately-shaped toothed sector 29 that is movable between a first position (shown in solid lines) and a second position (shown in dashed outline). As shown in FIGS. 3B, 3D and 3E the sector 29 is engaged with a drive gear 33 (shown in dashed outline) that is connected for rotation with an intermediate gear 44 (shown in dashed outline). Both gears 33 and 44 rotate on a gear shaft 31. The gear 44 is, in turn, engaged with a worm 28 (shown in dashed outline) that is driven by a bidirectional motor 30. The motor 30 is fixedly mounted to the base plate 32 by any suitable fasteners, examples of which are shown at 36 in FIG. 3C. A sector guard shown at 34 in FIG. 3C keeps the sector 29 from lifting so that the sector 29 and the gear 33 remain engaged during operation of the sunroof assembly 10.

As a result of the worm 28 and the gears 33 and 44, the motor 30 is operatively connected to the sector 29. In other words, the motor 30 is operatively connected to the drive gear 33, and the drive gear 33 operatively connects the motor 30 to the sector 29.

The motor 30, the worm 28 and the gears 33 and 44 together make up an actuator for the sector 29 and the arm 25. In alternative embodiments, the actuator could have a different makeup. For example, the actuator may instead include a hand-crank that is accessible from inside the vehicle 99, and that drives a drive gear that meshes with the sector 29.

With reference to FIGS. 3B, 3D and 3E, the drive arm 25 is slidably engaged with a transversely extending guide channel 51 provided in a transversely extending channel member 45. The channel member 45 may itself be mounted to a support member 35 (FIG. 1A) that extends between the sliders 15 and which may be secured to the sliders 15 by fasteners 46 (FIG. 1B) with mechanical fasteners (not shown). The channel member 45 may itself be formed from two components including a support member that is secured to the sliders 15 that has a simple cross-sectional shape and a channel defining member is provided in the channel member 45 in any suitable fashion, for example with mechanical fasteners at one or more securement points 37 in the channel member 45. As noted above, the sliders 15 are secured to the sunroof panel 11. As a result of this arrangement, the drive arm 25 may be said to be slidable transversely relative to the sunroof panel 11.

The slidable engagement between the drive arm 25 may be provided by a slider 40 that is slidably engaged in the guide channel 51 and that is pivotally connected to the drive arm 25 via a slider pin 41 (FIGS. 3B, 3D and 3E). As seen in FIG. 3B, the slider 40 may be a generally rectangular prism slidably captured in the generally rectangular guide channel 51. The slider 40 and guide channel 51 may alternatively each have any other suitable shape. The slider pin 41 may be fixedly secured to a drive end 49 of the drive arm 25, in any suitable manner, for example using a rivet or the like. The slider pin 41 further comprises a generally spherical contact structure 42 (FIG. 3E) that is captured within a hollow spherical aperture 43 in the slider 40 to form a ball and socket joint. As a result, the slider 40 is able to universally pivot on the spherical contact structure 42, which allows the slider 40 to slide freely along the length of the guide channel 51 while accommodating some misalignment of components and some frictional forces that can act between the slider 40 and the guide channel 51 during operation of the drive arm 25. The slider 40 and the channel member 45 are preferably made of materials that reduce the coefficient of friction therebetween. For example, the slider 40 may be made of a suitable plastic such as Duracon CP15X. The channel member 45 may be made from a suitable metal such as a suitable steel or aluminum.

As a result of the arrangement described above, the drive end 49 of the drive arm 25 is laterally movable relative to the sunroof panel 11, but is operatively connected to the sunroof panel 11 to drive the sunroof panel 11 longitudinally between the open and closed positions during pivoting movement of the toothed sector 29 between the first and second positions (FIG. 4).

With reference to FIG. 4, in operation the drive system 20 moves the sunroof panel 11 between a closed position (shown in solid lines), which corresponds to the first position of the sector 29 and an open position (shown in dashed outline), which corresponds to the second position of the sector 29. To open the sunroof panel 11, the motor 30 rotates in an opening direction, which applies torque to the sector 29 via the worm 28, the worm gear 44 and the gear 33. In the view shown in FIG. 4 the sector 29 pivots in a counter-clockwise direction towards the open position thereby causing the drive arm 25 to drive the sunroof panel 11 longitudinally towards the open position, while permitting the drive end 49 of the drive arm 25 to move laterally relative to the sunroof panel 11 as needed. When in the open position in FIG. 4, the sunroof panel, the drive arm, the sector, the channel member and the slider are identified at 10', 25', 45' and 40' respectively. Driving the motor 30 in a closing direction (which is opposite to the opening direction) will cause the sector 29 and drive arm 25 to pivot clockwise, thereby bringing the sunroof from the open position to the closed position. The closing direction of rotation of the motor 30 may be referred to as the first direction of rotation of the motor 30 since this rotation drives the drive arm 25 towards the first position. Analogously, the opening direction of rotation of the motor 30 may be referred to as the second direction of rotation of the motor 30.

The drive arm 25 travels through an arc of any suitable selected swept angle to drive the sunroof panel 11 between the open and closed positions. In the closed position, the drive arm 25 may point in a generally longitudinally forward direction while in the open position the drive arm 25' may point in a generally longitudinally rearward direction. Further, the slider 40 is in approximately the same transverse position in the guide channel 51 when the sunroof panel 11 is in the closed position as when the sunroof assembly 10 is in the open position. Such a configuration arises when the sector pivot axis 26 has approximately the same distance longitudinally to the drive end 49 of the drive arm 25 when the sector 29 is in the first position as when the sector 29 is in the second position. Such positioning of the pivot axis 26 reduces the total amount of lateral movement carried out by the drive end 49 of the drive arm 25 when moving from one position to the other. As would be apparent to one skilled in the art, the base plate 32 could alternatively be mounted in any other suitable location as the length of the drive arm 25 can accommodate various placements of the base plate in relation to the channel member in the open and closed positions.

It will be noted that sunroof assemblies vary in width, length and range of travel from one vehicle model to another. For example, an automaker may have a luxury vehicle that is large and wide, and that has a large, wide sunroof. That same automaker may have an entry-level model that is generally smaller and that has a smaller sunroof that requires a smaller range of travel than the sunroof on the luxury model. Using the drive system 20 shown and described herein, the same drive system 20 can be used without modification on a range of sizes of sunroof assembly 10. This is helpful to an automaker by reducing the parts count in the automaker's inventory since multiple different or modified drive systems 20 need not be kept in inventory.

It will further be noted that all of the motive power that is transferred to the sunroof panel 11 from the actuator is transferred through the drive arm 25. In other words, the sunroof assembly 10 operates to move the sunroof panel 11 with a single drive arm 25, and thus without the need for a scissor-type of mechanism.

As can be seen from FIG. 3C in particular, it will be noted that the channel member 45 (and the guide channel 51), the motor 30, the gears 33 and 44, the sector 29 and the drive arm 25 all extend in planes that are generally parallel to one another and therefore to the sunroof panel 11 (since the channel member 45 extends in a plane that is parallel to the sunroof panel 11). This facilitates reducing the overall occupied height of the sunroof assembly 11, and the drive system 20 in particular, so as to reduce the intrusion of the drive system 20 into the space inside the vehicle cabin (not shown).

In general, where reference is made to lateral or transverse movement or orientation, it will be understood that such movement or orientation need not always be strictly interpreted. For example, in some embodiments, the guide channel 51 could be arranged at some selected angle relative to the lateral or transverse axis B-B' and therefore would not extend precisely laterally. Regardless, however, the drive end 49 of the drive arm 25 still moves laterally relative to the sunroof panel 11 during pivoting of the sector 29.

In general, where reference is made to a longitudinal movement or orientation, it will be understood that such movement or orientation need not always be strictly interpreted. For example, in some embodiments the movement of the sunroof panel 11 may be longitudinal but the path of the sunroof panel 11 may generally follow the curvature of the vehicle roof 97.

In general, reference to planes is intended to be understood as not to be interpreted strictly, in the sense that some planes may have some amount of gentle curvature. For example, the sunroof panel 11 may be said to extend in a plane even though there may be, in at least some embodiments, some amount of gentle curvature to the sunroof panel 11 to match the curvature of the vehicle roof 97.

While the sunroof assembly 10 has been described as a whole above, it will be noted that it is possible for an entity (e.g. a supplier company) to supply a portion of the sunroof assembly 10 to another entity (e.g. a vehicle assembler). For example, a supplier company could provide the drive system 20, including the channel member 45 that has the guide channel 51 and that is connectable to the sunroof panel 11, the final gear 29, the drive arm 25 that is operatively connected to the channel member 45 to drive the sunroof panel 11 longitudinally between the open and closed positions during pivoting movement of the final gear 29 between the first and second positions, and the actuator that is operatively engaged with the final gear 29 to drive the final gear 29 between the first and second positions. As noted above, in some embodiments, all motive power transferred to the sunroof panel 11 from the actuator is transferred through the drive arm 25.

Figure 5A:
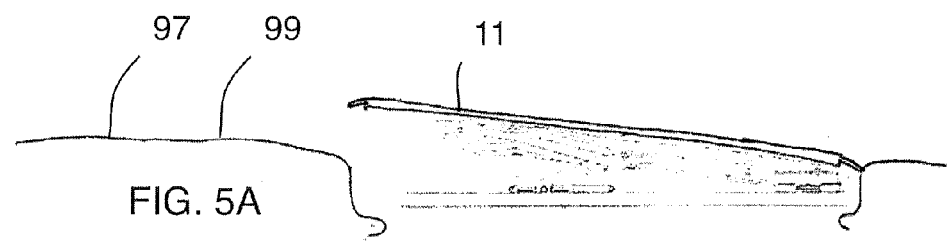
FIGS. 5A-5D are side views of the sunroof panel in several positions throughout a range of movement.
Figure 5B:
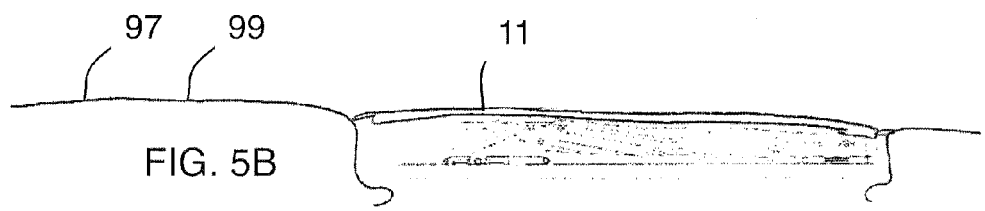
Figure 5C:
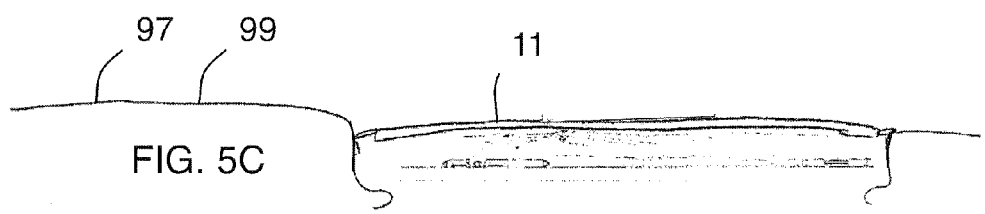
Figure 5D:
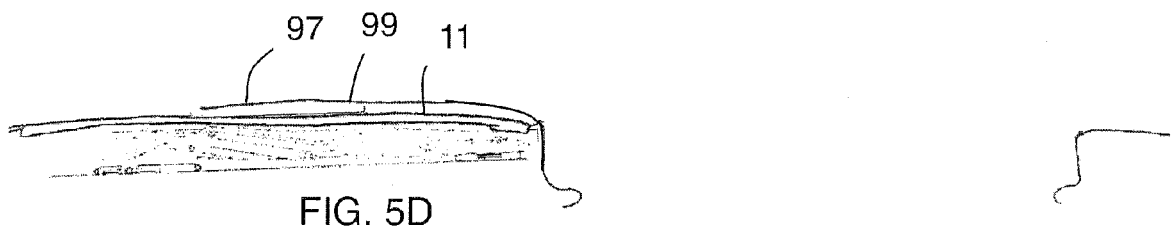

FIGS. 5A-5D show the optional range of movement for the sunroof panel 11. The sunroof panel 11 may be movable between an open position and a closed position, as shown in FIGS. 5B-5D and may also be movable between a venting position and a closed position (FIGS. 5A-5B). FIGS. 6A-6C show the sunroof panel 11 and the drive system 20, en route to the open position, in the closed position, and in the venting position respectively. When the sunroof panel 11 is in the closed position (FIG. 6B, the drive system 20 is operable (e.g. by rotating the motor 30 in a first direction) to drive the sunroof panel 11 to the open position. During an initial portion of the movement of the slider 15, the linkage 13 causes the sunroof panel 11 to pivot downwardly about a forward pivot axis 95 from the closed position (FIG. 6B) wherein the sunroof panel 11 is substantially flush with the roof 99, to a preparatory position for translational movement to the open position (FIG. 6A). Further rotation of the motor 30 will drive the slider 15 further leftwardly (in the view shown in FIG. 6A) to the open position. Rotation of the motor 30 in the second, opposite direction, drives the slider 15 rightwardly thereby bringing the sunroof panel 11 from the open position back to the closed position (FIG. 6B). Further rotation of the motor 30 in the second direction drives the slider 15 further rightwardly, which drives the sunroof panel 11 from the closed position (FIG. 6B) to the venting position (FIG. 6C). When the sunroof panel 11 is in the venting position, rotation of the motor 30 in the first direction brings the sunroof panel 11 to the closed position. In the embodiment shown in FIGS. 5A-5D and 6A-6C, the sunroof assembly 10 is capable of movement between open and closed positions, and between closed and venting positions. It will be understood, however, that the sunroof assembly 10 need not be capable of movement to a venting position; the sunroof assembly 10 may be capable of only movement between the open and closed positions. In embodiments wherein the sunroof panel 11 is drivable between venting and open positions, the range of travel of the final gear 29 and drive arm 25 may be selected to permit it. Thus the closed position represents an intermediate position for the final gear 29 and drive arm 25 in its range of travel.

While the description contained herein constitutes a plurality of embodiments of the present invention, it will be appreciated that the present invention is susceptible to further modification and change without departing from the fair meaning of the accompanying claims.

The invention claimed is:

1. A sunroof assembly for a roof of a vehicle, comprising:
   a sunroof panel having a longitudinal axis and which is mounted to the roof of the vehicle via first sliders moving in longitudinal guides for longitudinal movement between an open position and a closed position;

a final gear that is mounted to a stationary member on the roof of the vehicle, and is pivotable about a pivot axis between a first position and a second position; and a drive arm that is pivotable with the final gear about the pivot axis and which has a drive end that is laterally movable relative to the sunroof panel but that is operatively connected to the first sliders to drive the sunroof panel longitudinally between the open and closed positions during pivoting movement of the final gear between the first and second positions.

2. A sunroof assembly as claimed in claim 1, wherein the final gear is a sector.

3. A sunroof assembly as claimed in claim 1, wherein the drive arm is operatively connected to the sunroof panel via a second slider that is laterally movable in a guide channel.

4. A sunroof assembly as claimed in claim 3, wherein the second slider is mounted to the drive end of the drive arm and the guide channel is connected to the sunroof panel.

5. A sunroof assembly as claimed in claim 4, wherein the second slider is pivotally mounted to the drive end of the drive arm by means of a ball joint.

6. A sunroof assembly as claimed in claim 1, further comprising a bidirectional motor that is operatively connected to a drive gear that meshes with the final gear thereby operatively connecting the motor to the final gear, wherein rotation of the motor in a first direction drives the final gear towards the first position, and rotation of the motor in a second direction drives the final gear towards the second position.

7. A sunroof assembly as claimed in claim 1 further including an actuator to transfer motive power to the sunroof panel, wherein all motive power transferred to the sunroof panel from the actuator is transferred through the drive arm.

8. A sunroof assembly as claimed in claim 6, wherein the final gear is further pivotable to a third position, wherein the second position is between the first and third positions, wherein movement of the final gear to the third position drives the sunroof panel beyond the closed position to a venting position.

9. A drive system for driving a sunroof panel longitudinally on a roof of a vehicle, comprising:

a channel member that has a guide channel that extends laterally and that is connectable to a sunroof panel;

the sunroof panel being mounted to the roof of the vehicle via first sliders moving in longitudinal guides for longitudinal movement between an open position and a closed position;

a final gear that is mounted to a stationary member on the roof of the vehicle, and is pivotable about a pivot axis between a first position and a second position;

a drive arm that is pivotable with the final gear about the pivot axis and which has a drive end that is laterally movable relative to the channel member but that is operatively connected to the first sliders to drive the sunroof panel longitudinally between the open and closed positions during pivoting movement of the final gear between the first and second positions; and a bidirectional motor that is operatively connected to a drive gear that meshes with the final gear thereby operatively connecting the motor to the final gear, wherein the motor, the drive gear, the final gear, the drive arm and the channel member all extend in planes that are generally parallel to one another.

10. A drive system as claimed in claim 9, wherein the final gear is a sector.

11. A drive system as claimed in claim 9, wherein the drive arm is operatively connectable to the channel member via a second slider mounted at the drive end of the drive arm, wherein the second slider is laterally movable in the guide channel.

12. A drive system as claimed in claim 11, wherein the second slider is pivotally mounted to the drive end of the drive arm by means of a ball joint.

13. A sunroof assembly as claimed in claim 1, wherein the final gear is a sector;

the drive arm is operatively connected to the sunroof panel via a second slider that is laterally movable in a guide channel;

the second slider is mounted to the drive end of the drive arm and the guide channel is connected to the sunroof panel;

the second slider is pivotally mounted to the drive end of the drive arm by a ball joint; and further comprising:

a bidirectional motor that is operatively connected to a drive gear that meshes with the final gear thereby operatively connecting the motor to the final gear, wherein rotation of the motor in a first direction drives the final gear towards the first position, rotation of the motor in a second direction drives the final gear towards the second position, the final gear is further pivotable to a third position, the second position is between the first and third positions, movement of the final gear to the third position drives the sunroof panel beyond the closed position to a venting position, and all power transferred to the sunroof panel from the motor is transferred through the drive arm.

14. A sunroof assembly as claimed in claim 3, wherein said second slider is in approximately the same transverse position in the guide channel when the sunroof panel is in the closed position as when the sunroof panel is in the open position.

* * * * *